United States Patent
Neiger et al.

(10) Patent No.: US 7,370,160 B2
(45) Date of Patent: May 6, 2008

(54) VIRTUALIZING MEMORY TYPE

(75) Inventors: Gilbert Neiger, Portland, OR (US);
Steven M. Bennett, Hillsboro, OR (US); Andrew V. Anderson, Hillsboro, OR (US); Dion Rodgers, Hillsboro, OR (US); David Koufaty, Portland, OR (US); Richard A. Uhlig, Hillsboro, OR (US); Camron B. Rust, Hillsboro, OR (US); Larry O. Smith, Beaverton, OR (US); Rupin H. Vakharwala, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 270 days.

(21) Appl. No.: 11/171,993

(22) Filed: Jun. 29, 2005

(65) Prior Publication Data
US 2007/0005870 A1  Jan. 4, 2007

(51) Int. Cl.
*G06F 12/00* (2006.01)
(52) U.S. Cl. .............. 711/154; 711/202; 711/203; 711/205; 711/206
(58) Field of Classification Search ............ 711/154, 711/202, 203, 205, 206, 207
See application file for complete search history.

(56) References Cited

U.S. PATENT DOCUMENTS

2003/0163662 A1* 8/2003 Glew et al. .............. 711/202

OTHER PUBLICATIONS

Advanced Micro Devices; "AMD64 Virtualization Codenamed "Pacifica" Technology"; Secure Virtual Machine Architecture Reference Manual; pp. 49-51; http://enterprise.amd.com/downloadables/Pacifica_Spec.pdf.
IBM System/370 Extended Architecture; Interpretive Execution; Publication No. SA22-7095-1; File No. S370-01.

* cited by examiner

*Primary Examiner*—Kimberly Mclean
(74) *Attorney, Agent, or Firm*—Thomas R. Lane

(57) ABSTRACT

A processor, capable of operation in a host machine, including memory management logic to support a plurality of memory types for a physical memory access by the processor, and virtualization support logic to determine a host memory type for a reference to a memory location by a guest in a virtual machine executable on the processor based at least in part on a memory type field stored in an entry of an extended paging table of a virtualization support system of the host machine (extended memory type field), to determine a guest memory type for the reference to the memory location, and to determine an effective memory type based on at least one of the host memory type and the guest memory type.

34 Claims, 8 Drawing Sheets

VIRTUALIZING MEMORY TYPE

CROSS-REFERENCE TO RELATED APPLICATION

The present application is related to pending U.S. patent application Ser. No. 11/036,736 entitled "Virtualizing Physical Memory in a Virtual Machine System" assigned to the assignee of the present invention.

BACKGROUND

Virtualization enables a single host machine with hardware and software support for virtualization to present an abstraction of the host, such that the underlying hardware of the host machine appears as one or more independently operating virtual machines. Each virtual machine may therefore function as a self-contained platform. Often, virtualization technology is used to allow multiple guest operating systems and/or other guest software to coexist and execute apparently simultaneously and apparently independently on multiple virtual machines while actually physically executing on the same hardware platform. A virtual machine may mimic the hardware of the host machine or alternatively present a different hardware abstraction altogether.

Virtualization systems may include a virtual machine monitor (VMM) which controls the host machine. The VMM provides guest software operating in a virtual machine with a set of resources (e.g., processors, memory, IO devices). The VMM may map some or all of the components of a physical host machine into the virtual machine, and may create fully virtual components, emulated in software in the VMM, which are included in the virtual machine (e.g., virtual IO devices). The VMM may thus be said to provide a "virtual bare machine" interface to guest software. The VMM uses facilities in a hardware virtualization architecture to provide services to a virtual machine and to provide protection from and between multiple virtual machines executing on the host machine.

As guest software executes in a virtual machine, certain instructions executed by the guest software (e.g., instructions accessing peripheral devices) would normally directly access hardware, were the guest software executing directly on a hardware platform. In a virtualization system supported by a VMM, these instructions may cause a transition to the VMM, referred to herein as a virtual machine exit. The VMM handles these instructions in software in a manner suitable for the host machine hardware and host machine peripheral devices consistent with the virtual machines on which the guest software is executing. Similarly, certain interrupts and exceptions generated in the host machine may need to be intercepted and managed by the VMM or adapted for the guest software by the VMM before being passed on to the guest software for servicing. The VMM then transitions control to the guest software and the virtual machine resumes operation. The transition from the VMM to the guest software is referred to herein as a virtual machine entry.

As is well known, a process executing on a machine on most operating systems may use a virtual address space, which is an abstraction of the underlying physical memory system. As is known in the art, the term virtual when used in the context of memory management e.g. "virtual address," "virtual address space," "virtual memory address" or "virtual memory space," refers to the well known technique of a processor-based system, generally in conjunction with an operating system, presenting an abstraction of underlying physical memory to a process executing on a processor-based system. For example, a process may access a virtual, contiguous and linearized address space abstraction which is mapped to non-linear and non-contiguous physical memory by the underlying operating system. This use of virtual is distinguishable from the use of the same term used in the context virtualization, where virtual generally refers to an abstraction that simulates a physical machine e.g. "virtual machine," "virtual bare machine," "virtual hardware," "virtual processor" or "virtual network interface." The intended meaning of the term will be clear to one in the art based on the context in which it is used herein.

A processor may be designed in general to allow data from memory to be cached by the processor. Additionally, accesses to data in memory may require one or more actions to be taken with regard to the contents of caching structures in the system processor or processors. These actions are referred to herein as snooping characteristics. Furthermore, certain processors may select to allow dynamic reordering of memory accesses. The type of caching, if any (cacheability) used by the processor to access a location in memory, the snooping characteristics and whether dynamic reordering of memory accesses is enabled for that location determines certain behaviors of the memory location, such as for example whether the memory location supports ordering operations or side-effects of reads correctly. These attributes and others that relate to memory behavior are called a memory type and may be specified for a given memory location and access event using a variety of system flags and registers. Memory types may include, for example, "uncacheable", "write combining", "write through", "write back", and "write protect". Memory type range registers, a page attribute table, page tables and other processor control register fields may determine, for each memory access, the relevant memory type for the linear or physical address being accessed. The communication protocols utilized by a processor may vary depending on the memory type of the memory location being accessed.

When a virtual machine executes on a processor supporting different memory types, the virtual machine may also, similarly, support specific memory types for the access of virtual machine physical memory. When the guest accesses memory of a certain memory type in the virtual machine, the correctness of guest execution may depend on the memory access type of the host being consistent with that specified by the guest. Therefore, it is necessary to reconcile memory type specification in the guest with memory type specification in the host in a virtualization system that supports memory type specification.

DETAILED DESCRIPTION

Figure 1:
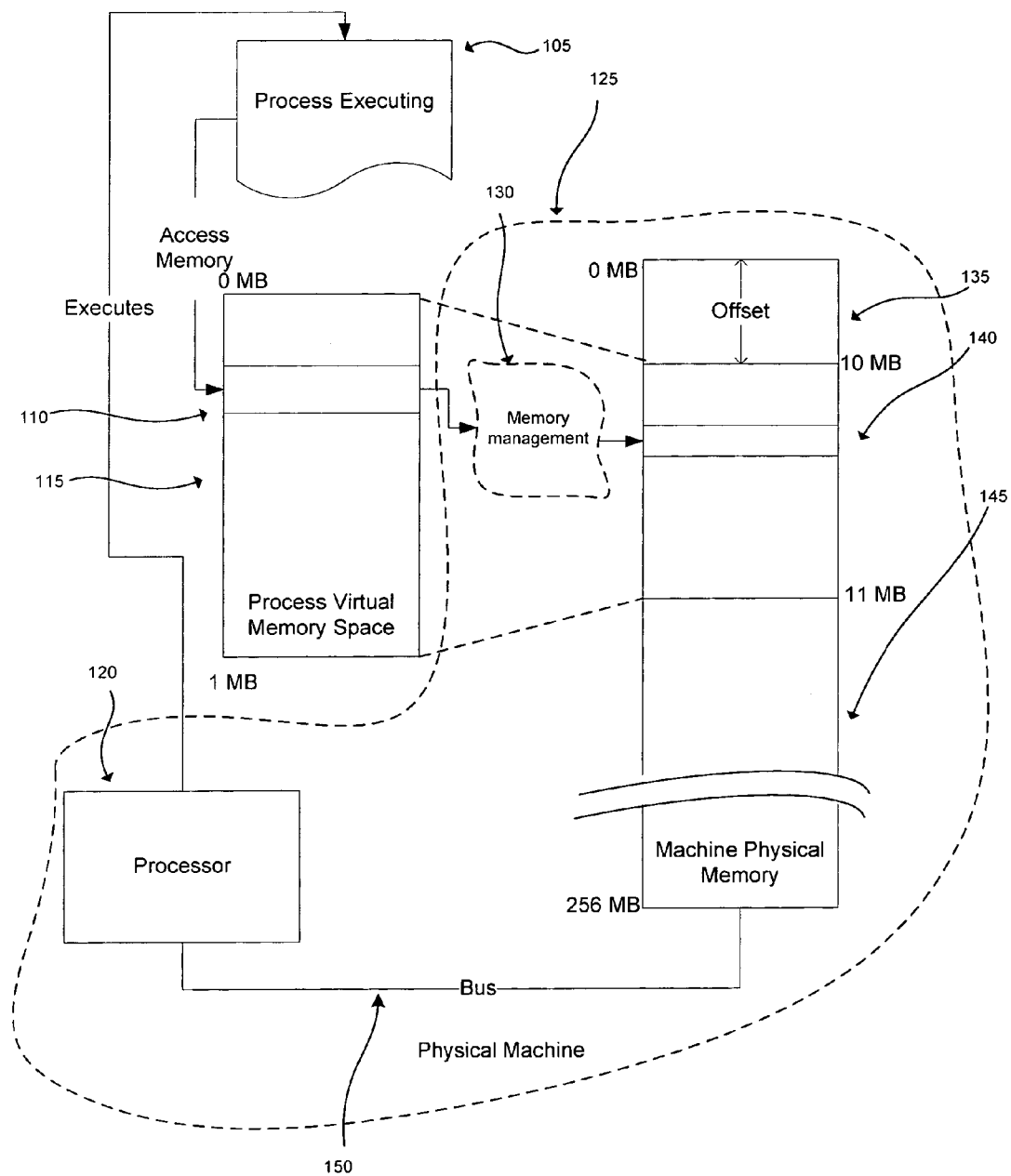
FIG. 1 depicts the relationship between process and physical memory.

FIG. 1 shows a process executing on a processor-based system which incorporates a processor and a memory communicatively coupled to the processor by a bus. With reference to FIG. 1, when a process 105 references a memory location 110 in its virtual address space 115 (process virtual memory space), a reference to an actual address 140 in the physical memory 145 of the machine 125 (machine physical memory) is generated by memory management 130, which may be implemented in hardware (sometimes incorporated into the processor 120) and software (generally in the operating system of the machine). Memory management 130, among other functions maps a location in the virtual address space to a location in physical memory of the machine. As shown in FIG. 1, a process may have a different view of memory from the actual memory available in the physical machine. In the example depicted in FIG. 1, the process operates in a virtual address space from 0 to 1 MB which is actually mapped by the memory management hardware and software into a portion of the physical memory which itself has an address space from 10 to 11 MB; to compute a physical address from a process space address, an offset 135 may be added to the process virtual address. More complex mappings from process virtual memory space to physical memory are possible, for example, the physical memory corresponding to process virtual memory may be divided into parts such as pages and be interleaved with pages from other processes in physical memory.

Memory is customarily divided into pages, each page containing a known amount of data, varying across implementations, e.g. a page may contain 4096 bytes of memory. As memory locations are referenced by the executing process, they are translated into page references. In a typical machine, memory management maps a reference to a page in process virtual memory to a page in machine physical memory. In general, memory management may use a page table to specify the physical page location corresponding to a process space page location.

One aspect of managing guest software in a virtual machine environment is the management of memory. Handling memory management actions taken by the guest software executing in a virtual machine creates complexity for a controlling system such as a virtual machine monitor. Consider for example a system in which two virtual machines execute via virtualization on a host machine implemented on a 32-bit IA-32 Intel® Architecture platform (IA-32), which is described in the IA-32 *Intel® Architecture Software Developer's Manual* (IA-32 documentation). The IA-32 platform may include IA-32 page tables implemented as part of an IA-32 processor. Further, assume that each virtual machine itself presents an abstraction of an IA-32 machine to the guest software executing thereon. Guest software executing on each virtual machine may make references to a guest process virtual memory address, which in turn is translated by the guest machine's memory management system to a guest-physical memory address. However, guest-physical memory itself may be implemented by a further mapping in host-physical memory through a VMM and the virtualization subsystem in hardware on the host processor. Thus, references to guest memory by guest processes or the guest operating system, including for example references to guest IA-32 page table control registers, must then be intercepted by the VMM because they cannot be directly passed on to the host machine's IA-32 page table without further reprocessing, as the guest-physical memory does not, in fact, correspond directly to host-physical memory but is rather further remapped through the virtualization system of the host machine.

Figure 2:
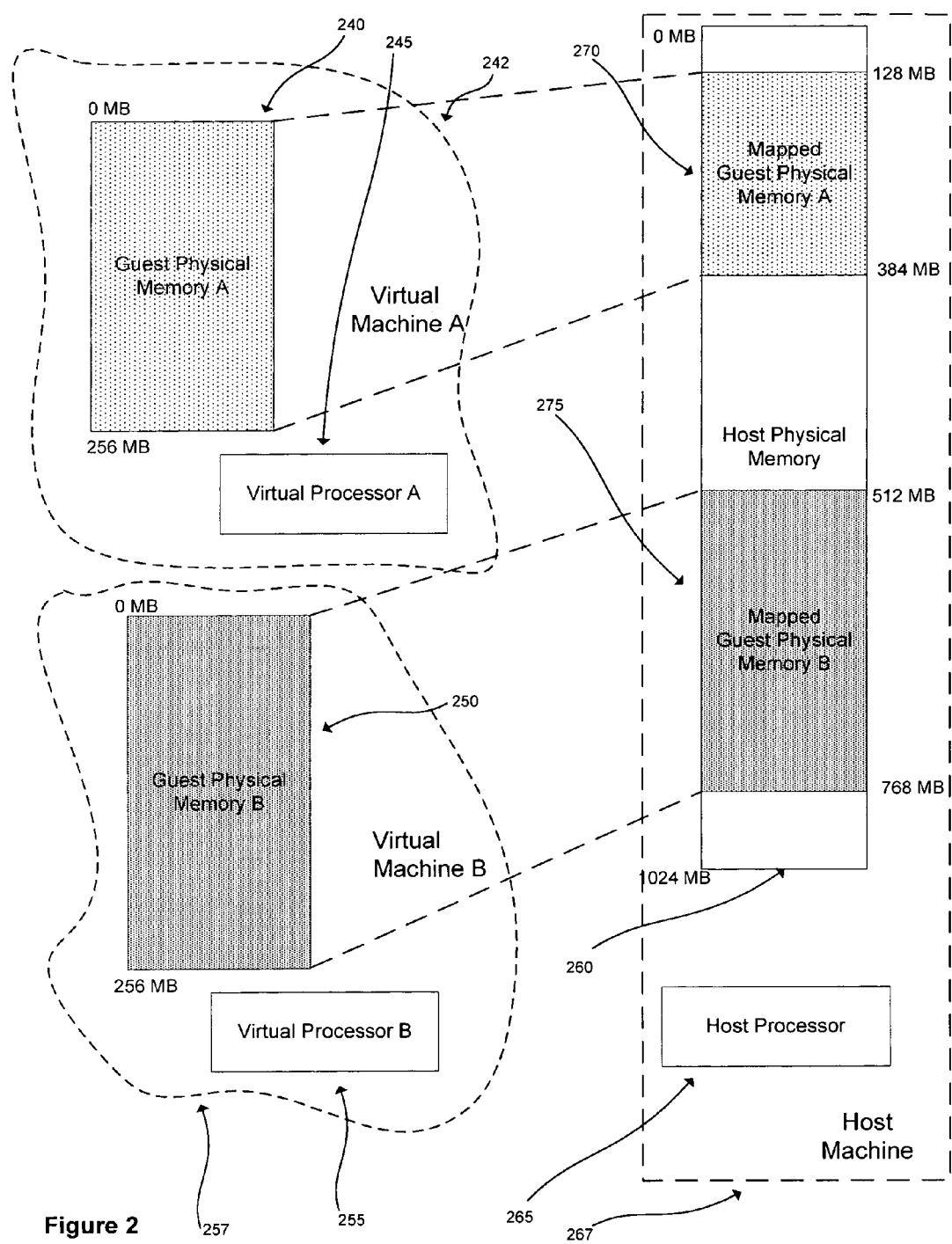
FIG. 2 depicts abstractly the relationship between virtual machines and a host machine in one embodiment.

FIG. 2: FIG. 2 depicts the relationship between one or more virtual machines executing on a host machine with specific regard to the mapping of guest memory in one embodiment. FIG. 2 illustrates how guest-physical memory is remapped through the virtualization system of the host machine. Each virtual machine such as virtual machine A, 242, and virtual machine B, 257, presents a virtual processor 245 and 255 respectively to guest software running on the virtual machines. Each machine provides an abstraction of physical memory to the guest operating system or other guest software, guest-physical memories 240 and 250, respectively. As guest software executes on the virtual machines 242 and 257, it is actually executed by the host machine 267 on host processor 265 utilizing host-physical memory 260.

As shown in FIG. 2, in this embodiment, guest-physical memory 240 which is presented as a physical memory space starting at address 0 in virtual machine A, 242, is mapped to some contiguous region 270 in host-physical memory 260. Similarly, guest-physical memory 250 in virtual machine B, 257, is mapped to a different portion 275 of host-physical memory 260. As shown in FIG. 2, the host machine might have 1024 MB of host-physical memory. If each virtual machine 242 and 257 is assigned 256 MB of memory, one possible mapping might be that virtual machine A, 242, is assigned the range 128-384 MB and virtual machine B, 257, is assigned the range 512-768 MB. Both virtual machines 242 and 257 reference a guest-physical address space of 0-256 MB. Only the VMM is aware that each virtual machine's address space maps to different portions of the host-physical address space.

The virtual machines and memory mapping shown in FIG. 2 are only one representation of one embodiment, in other embodiments, the actual number of virtual machines executing on a host machine may vary from one to many; the actual memory sizes of the host machine and the virtual machines may vary and be variable from virtual machine to virtual machine. The example depicts a simple, contiguous allocation of memory to virtual machines. In a more general case, the physical-memory pages allocated to a virtual machine may not be contiguous and might be distributed in the host-physical memory interleaved with each other and with pages belonging to the VMM and to other host processes.

A processor-based system that is presented as a virtual machine in a system such as that depicted in FIG. 2 may implement a virtual machine in all its complexity. Thus for example, a virtual machine may present a full view of guest-physical memory to the guest OS, and perform memory management for guest software executing on the virtual machine, using memory management provided by the guest OS and the virtual processor or other virtual hardware of the virtual machine. In one exemplary embodiment, the virtual machine may present an IA-32 platform including IA-32 hardware support such as page tables for memory management to the guest OS, and in turn be actually executing on a host platform which is also an IA-32 platform including IA-32 hardware for memory management. Without additional mechanisms, a virtualization system in this embodiment must implement a physical-memory virtualization algorithm in the VMM using, as one possible solution, IA-32 page table shadowing to remap, partition and protect physical memory. Thus, for example, when guest software attempts to access the IA-32 page tables of the virtual machine, the VMM must overlay functionality required for virtualization (e.g., remapping physical addresses) onto the functionality required by the guest OS.

To this end, the VMM must trap a variety of events surrounding the use of the paging mechanism by the guest software. This includes writes to control registers such as control registers of the IA-32 memory management system (e.g., CR0, CR3 and C4), accesses to model-specific registers (MSRs) associated with paging and memory access (e.g., memory-type range registers (MTRRs)), handling certain exceptions (e.g., page faults), as described in the IA-32 documentation. This use of the IA-32 page tables to virtualize physical memory is complex and exacts a significant performance overhead.

Figure 3:
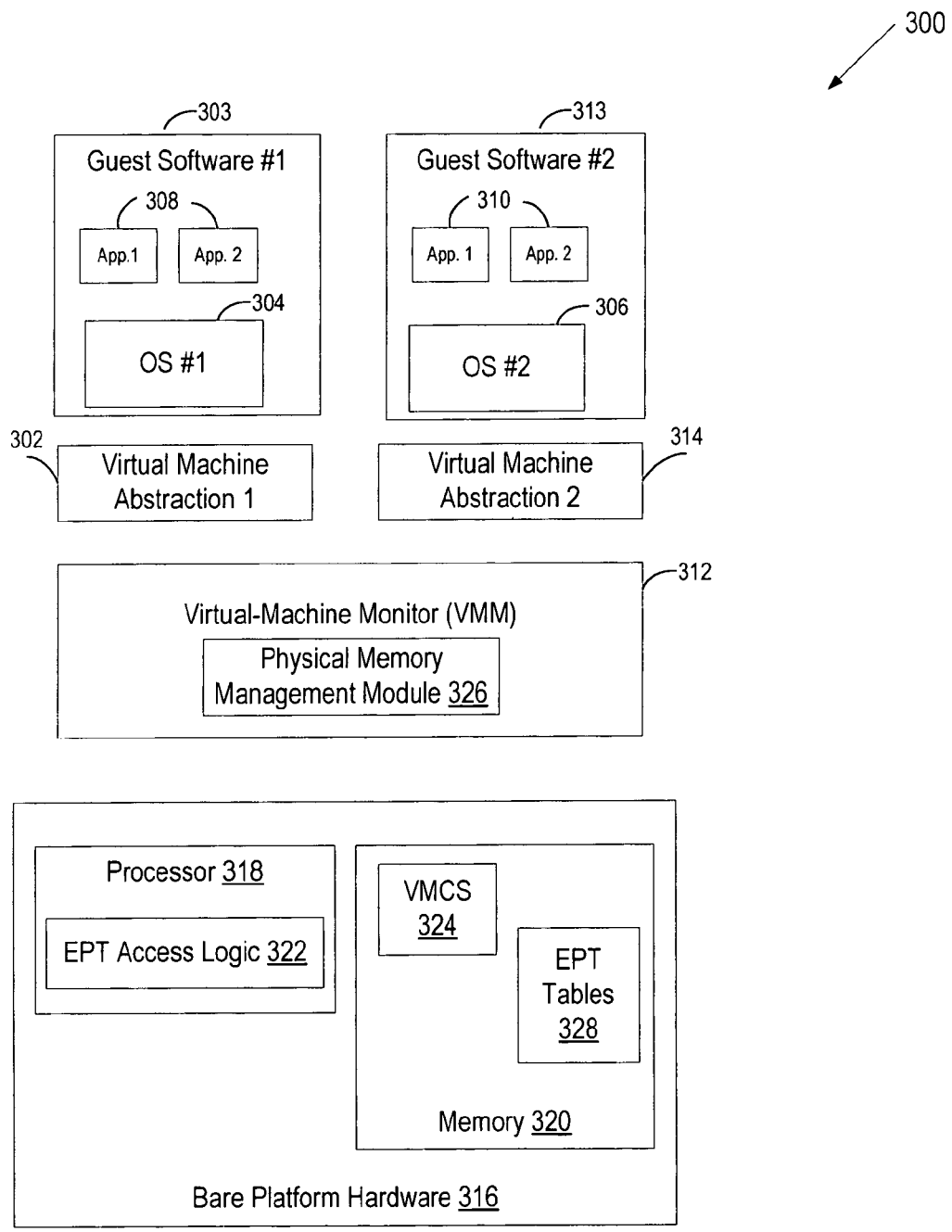
FIG. 3 depicts a high level structure of a virtual machine environment in one embodiment.

FIG. 3: FIG. 3 illustrates one embodiment of a virtual-machine environment 300. In this embodiment, a processor-based platform 316 may execute a VMM 312. The VMM, though typically implemented in software, may emulate and export a virtual bare machine interface to higher level software. Such higher level software may comprise a standard OS, a real time OS, or may be a stripped-down environment with limited operating system functionality and may not include OS facilities typically available in a standard OS in some embodiments. Alternatively, for example, the VMM 312 may be run within, or using the services of, another VMM. VMMs may be implemented, for example, in hardware, software, firmware or by a combination of various techniques in some embodiments. In at least one embodiment, one or more components of the VMM may execute in one or more virtual machines and one or more components of the VMM may execute on the bare platform hardware as depicted in FIG. 3. The components of the VMM executing directly on the bare platform hardware are referred to herein as host components of the VMM.

The platform hardware 316 may be a personal computer (PC), mainframe, handheld device such as a personal digital assistant (PDA) or "smart" mobile phone, portable computer, set top box, or another processor-based system. The platform hardware 316 includes at least a processor 318 and memory 320. Processor 318 may be any type of processor capable of executing programs, such as a microprocessor, digital signal processor, microcontroller, or the like. The processor may include microcode, programmable logic or hard coded logic for execution in embodiments. Although FIG. 3 shows only one such processor 318, there may be one or more processors in the system in an embodiment. Additionally, processor 318 may include multiple cores, support for multiple threads, or the like. Memory 320 can comprise a hard disk, a floppy disk, random access memory (RAM), read only memory (ROM), flash memory, any combination of the above devices, or any other type of machine medium readable by processor 318 in various embodiments. Memory 320 may store instructions and/or data for performing program execution and other method embodiments.

The VMM 312 presents to guest software an abstraction of one or more virtual machines, which may provide the same or different abstractions to the various guests. FIG. 3 shows two virtual machines, 302 and 314. Guest software such as guest software 303 and 313 running on each virtual machine may include a guest OS such as a guest OS 304 or 306 and various guest software applications 308 and 310. Guest software 303 and 313 may access physical resources (e.g., processor registers, memory and I/O devices) within the virtual machines on which the guest software 303 and 313 is running and to perform other functions. For example, the guest software 303 and 313 expects to have access to all registers, caches, structures, I/O devices, memory and the like, according to the architecture of the processor and platform presented in the virtual machine 302 and 314.

In one embodiment, the processor 318 controls the operation of the virtual machines 302 and 314 in accordance with data stored in a virtual machine control structure (VMCS) 324. The VMCS 324 is a structure that may contain state of guest software 303 and 313, state of the VMM 312, execution control information indicating how the VMM 312 wishes to control operation of guest software 303 and 313, information controlling transitions between the VMM 312 and a virtual machine, etc. The processor 318 reads information from the VMCS 324 to determine the execution environment of the virtual machine and to constrain its behavior. In one embodiment, the VMCS 324 is stored in memory 320. In some embodiments, multiple VMCS structures are used to support multiple virtual machines.

The VMM 312 may need to manage the physical memory accessible by guest software running in the virtual machines 302 and 314. To support physical memory management in one embodiment, the processor 318 provides an extended page table (EPT) mechanism. In the embodiment, the VMM 312 may include a physical memory management module 326 that provides values for fields associated with physical memory virtualization that may need to be provided before transition of control to the virtual machine 302 or 314. These fields are collectively referred to as EPT controls. EPT controls may include, for example, an EPT enable indicator specifying whether the EPT mechanism should be enabled and one or more EPT table configuration controls indicating the form and semantics of the physical memory virtualization mechanism. These will be discussed in detail below. Additionally, in one embodiment, EPT tables 328 indicate the physical address translation and protection semantics which the VMM 312 may place on guest software 303 and 313.

In one embodiment, the EPT controls are stored in the VMCS 324. Alternatively, the EPT controls may reside in a processor 318, a combination of the memory 320 and the processor 318, or in any other storage location or locations. In one embodiment, separate EPT controls are maintained for each of the virtual machines 302 and 314. Alternatively, the same EPT controls are maintained for both virtual machines and are updated by the VMM 312 before each virtual machine entry.

In one embodiment, the EPT tables 328 are stored in memory 320. Alternatively, the EPT tables 328 may reside in the processor 318, a combination of the memory 320 and the processor 318, or in any other storage location or locations. In one embodiment, separate EPT tables 328 are maintained for each of the virtual machines 302 and 314. Alternatively, the same EPT tables 328 are maintained for both virtual machines 302 and 314 and are updated by the VMM 312 before each virtual machine entry.

In one embodiment, the processor 318 includes EPT access logic 322 that is responsible for determining whether the EPT mechanism is enabled based on the EPT enable indicator. If the EPT mechanism is enabled, the processor translates guest-physical addresses to host-physical addresses-based on the EPT controls and EPT tables 328.

In one embodiment, in which the system 300 includes multiple processors or multi-threaded processors, each of the logical processors is associated with a separate EPT access logic 322, and the VMM 312 configures the EPT tables 328 and EPT controls for each of the logical processors.

Resources that can be accessed by guest software (e.g., 303, including guest OS 304 and application 308) may either be classified as "privileged" or "non-privileged." For privileged resources, the VMM 312 facilitates functionality desired by guest software while retaining ultimate control over these privileged resources. Further, each guest software 303 and 313 expects to handle various platform events such as exceptions (e.g., page faults, general protection faults, etc.), interrupts (e.g., hardware interrupts, software interrupts), and platform events (e.g., initialization (INIT) and system management interrupts (SMIs)). Some of these platform events are "privileged" because they must be handled by the VMM 312 to ensure proper operation of virtual machines 302 and 314 and for protection from and among guest software. Both guest operating system and guest applications may attempt to access privileged resources and both may cause or experience privileged events. Privileged platform events and access attempts to privileged resources are collectively referred to as "privileged events' or 'virtualization events" herein.

Figure 4A:
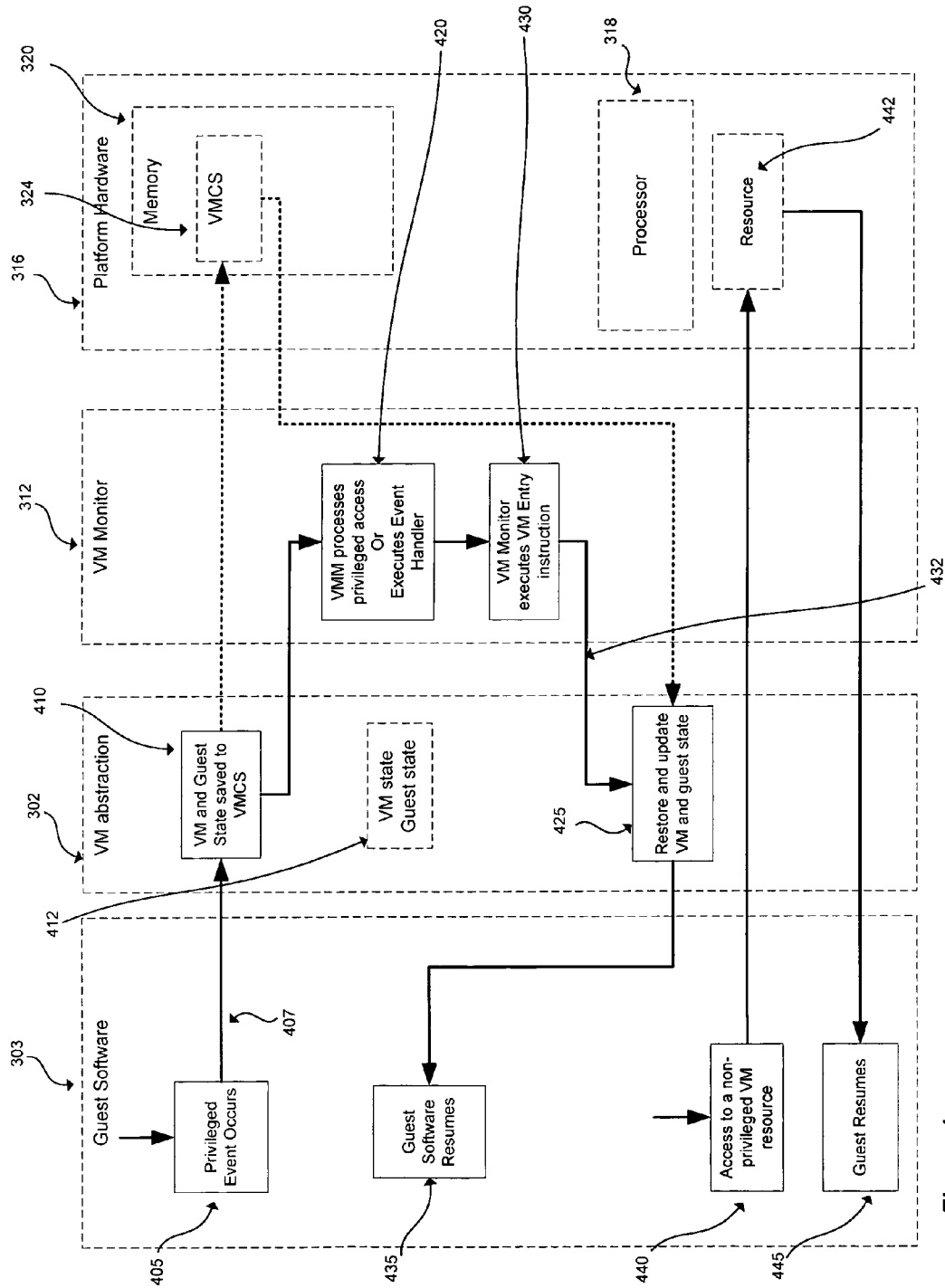
FIGS. 4a and 4b illustrate processing in one embodiment of a virtual machine environment.
Figure 4B:
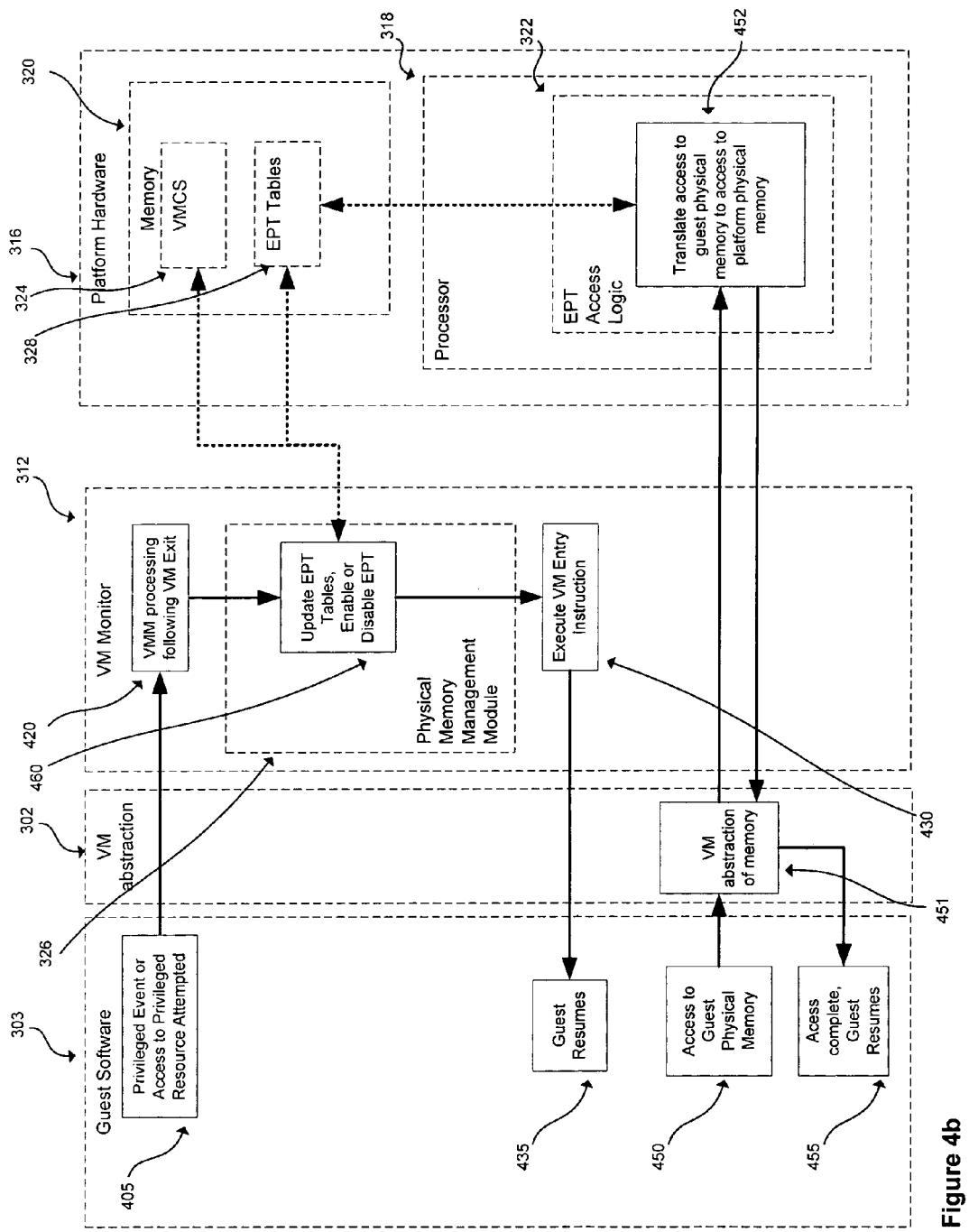

FIGS. 4a and 4b: Operation of a virtual machine environment in an embodiment such as that previously described and depicted in FIG. 3 is depicted by processing shown in FIGS. 4a and 4b. FIG. 4a depicts the operation of a VM environment in an embodiment to process a privileged event occurring in guest software; and the operation of the embodiment to process a non-privileged event by guest software. FIG. 4b depicts operations of a VM environment in an embodiment specifically related to extended paging tables, specifically relating to guest software access to guest-physical memory and to the management of the EPT mechanism in hardware by the VMM in the embodiment. FIGS. 4a and 4b do not depict all components or all operations that may occur in an environment such as that depicted in FIG. 3. This is solely for clarity of presentation. While a small set of components and a few specific operations are represented in FIGS. 4a and 4b, a VM environment in an embodiment may comprise many other components, and many other operations may take place in such an embodiment.

FIG. 4a is considered first. FIG. 4a depicts one exemplary set of operations of guest software 303 executing on a virtual machine abstraction 302, and platform hardware 316 previously described in FIG. 3. The operations are depicted within blocks indicating where in the system (e.g. in the VMM 312, in the guest software 303, etc.) they occur. In addition to other components of the VM environment previously described, VM abstraction 302 may store a virtual machine state and other state information for the guest software 303 at 412 and may also provide other resources such as a virtual network connection or set of general registers, to name two of many examples, to guests. Of course, the physical resources that implement VM state, guest state, and other VM resources are actually provided by the platform hardware 316 on which the VM executes. The platform hardware includes memory 320, VMCS 324 and processor 318.

At 440, guest software 303 accesses a non-privileged resource 442. Non-privileged resources do not need to be controlled by the VMM 312 and can be accessed directly by guest software which continues without invoking the VMM 312, allowing the guest to continue operation at 445 after accessing the non-privileged resource 442. A non-privileged platform event would likewise be handled without the intervention of the VMM 312 (this is not shown in FIG. 4a).

At 405, the guest software 303 attempts to access a privileged resource, and/or experiences a privileged platform event. When such a privileged event occurs as at 405, control may be transferred 407 to the VMM 312. The transfer of control 407 from guest software to the VMM 312 is referred to herein as a virtual machine exit. After facilitating the resource access or otherwise handling the privileged event appropriately, the VMM 312 may return control to guest software as at 432 which then resumes operation, 435. The transfer of control 432 from the VMM 312 to guest software is referred to as a virtual machine entry. In one embodiment, the VMM 312 initiates a virtual machine entry by executing an instruction specially designed to trigger the transition, 430, referred to herein as a virtual machine entry instruction.

In one embodiment, when a virtual machine exit occurs, components of the processor state used by guest software are saved, 410, components of the processor state required by the VMM 312 are loaded, and the execution resumes in the VMM 312 at 420. In one embodiment, the components of the processor state used by guest software are stored in a guest-state area of VMCS 324 and the components of the processor state required by the VMM 312 are stored in a monitor-state area of VMCS 324. The VMM 312 initiates a transition of control to the guest software at 430. In one embodiment, the VMM executes a specific instruction to initiate the transition. In one embodiment, when a transition from the VMM 312 to guest software occurs, components of the processor state that were saved at the virtual machine exit (and may have been modified by the VMM 312 while processing the virtual machine exit) are restored 425 and control is returned to the virtual machine 302 or 314.

Next, FIG. 4b is considered. As noted previously, FIG. 4b depicts those operations of the VM environment described above and depicted in FIG. 4a specifically related to extended paging tables, to guest program access to guest-physical memory and to the management of the EPT mechanism in hardware by the VMM in one embodiment. As before, for clarity of presentation FIG. 4b does not depict all components or all operations that may occur in a VM environment in an embodiment. While a small set of components and a few specific operations are represented in FIG. 4b, a VM environment in an embodiment may comprise many other components, and many other operations may take place in such an embodiment.

The components of the VM environment in the embodiment depicted in FIG. 4b are the guest software 303, VM 302, VMM 312 with a physical memory management module 326, and platform hardware or physical machine 316. The platform hardware further comprises memory 320, including, in this embodiment, a set of EPT tables 328 and a VMCS 324; and a processor 318 with EPT access logic 322. In general a use of the EPT facilities in platform hardware may be initiated by guest software, as shown in FIG. 4 at 450, when an access to guest-physical memory is made, for instance by the guest software 303. Guest-physical memory accesses are referred to the VM abstraction of memory 451 provided by VM 302, which in turn is referred to the physical machine 316. If the EPT mechanism is enabled, the platform hardware 316 may process the VM reference to guest-physical memory using the EPT access logic 322 and the EPT tables 328 to translate an access to guest-physical memory to an access to host-physical memory 320. Details of EPT operation are discussed with reference to FIGS. 5 and 6 below The EPT mechanism itself may be configured by the VMM 312 which configures the EPT tables 328 and the EPT controls which may be stored in the VMCS 324. In this embodiment, the configuration of the EPT mechanism may be done by the VMM 312 as part of the operation of the physical memory management module 326 following the processing of a privileged event 405 in the VMM 312 and prior to VM entry 430. In configuring the EPT mechanism, the VMM 312 may update the EPT tables 328 and EPT controls, in order to enable, disable or otherwise control the EPT mechanism, 460.

Of course, many other forms of processing are possible for the use of extended paging tables in conjunction with a VM environment, for example, different locations for the EPT controls and EPT tables 328 as discussed earlier with reference to FIG. 3, multiple VMs, multiple processors, multiple threads, multiple guests, and combinations of these variations, among many others.

The basic EPT mechanism is described in further detail in a previously filed patent application, listed above as a related patent application (EPT Patent Application). The above description of EPT is provided as background for the matter below.

A processor may have one or more caches as is known in the art. In one embodiment a processor may be able to specify the type of caching to be associated with a specific memory location in its physical memory, or may prohibit caching of that memory location. These attributes are generally termed cacheability. Furthermore, a processor may permit or disable of the dynamic reordering of memory accesses. This may be termed memory ordering. A general term for the properties of a memory location relevant to a process executing on a processor that may depend on its cacheability, snooping characteristics, communication protocols and on its memory ordering properties, among other factors, is the memory type of the memory location.

different supported memory types. For example, in an embodiment, the ordering characteristics of memory accesses (e.g., strongly ordered, weakly ordered, processor ordered) or the snooping characteristics (e.g., snooped, self-snooped, unsnooped) may be specified. Discussion herein of the specific elements of the IA-32 memory type support in no way limits the scope of the invention.

Figure 5:
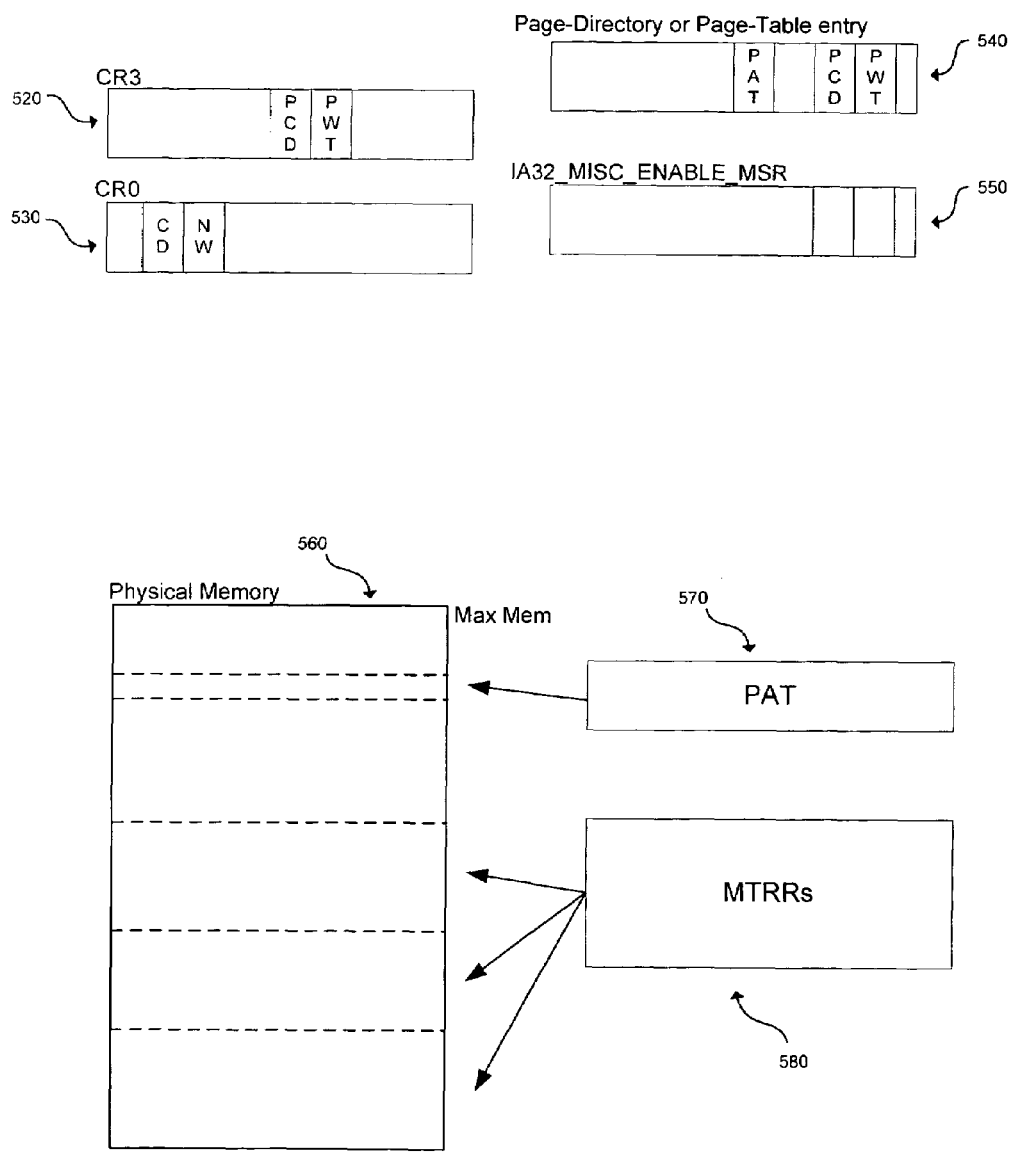
FIG. 5 depicts a memory type determination overview in one embodiment.

FIG. 5 FIG. 5 depicts memory type specification in an IA-32 embodiment. In the IA-32 embodiment, a hierarchy of cache control flags, registers, and tables operate to specify a memory type. While the details of these may be found in the IA-32 documentation, a brief overview is presented here to clarify the subject matter of this paper. IA-32 control registers CR0 530, and CR3 520 in certain IA-32 processors may each include a field, or fields (a specified range or ranges of bits), affecting memory type determination. For example, the global flags CD and NW in CR0 530 control overall caching. CR3 520 has flags PCD and PWT which control page directory caching. Other bits in the IA32_MISC_ENABLE_MSR register 550 may enable or disable the L3 cache of an IA-32 processor, if it is present.

Furthermore, as discussed above, paging in the IA-32 and other architectures is controlled at least in part by a page table in the processor, and the page-directory entry (PDE) or page-table entry (PTE) 540 referencing a page may contain fields affecting the memory type of the page, including PCD and PWT flags and the page access table bit (PAT) 570, among others. Finally, the PAT model specific register (MSR) 570 and the memory type range registers (MTRRs) 580 control caching of paged memory and of ranges of

TABLE 1

Memory types in an IA-32 embodiment

| Memory Type and Mnemonic | Cacheable | Writeback Cacheable | Allows Speculative Reads | Memory Ordering Model |
|---|---|---|---|---|
| Strong Uncacheable (UC) | No | No | No | Strong Ordering |
| Uncacheable (UC-) | No | No | No | Strong Ordering |
| Write Combining (WC) | No | No | Yes | Weak Ordering |
| Write Through (WT) | Yes | No | Yes | Speculative Processor Ordering |
| Write Back (WB) | Yes | Yes | Yes | Speculative Processor Ordering |
| Write Protected (WP) | Yes for reads; No for writes | No | Yes | Speculative Processor Ordering |

Table 1 depicts memory types in one embodiment, the IA-32 architecture, and their properties as described in the IA-32 documentation. As seen in Table 1, the specific memory type for a location in memory specifies the cacheablity and writeback cacheability of the data at the location, and whether speculative reading is allowed for the memory location accessed. The memory type for a location may thus determine a memory ordering model that may be assumed by a program using the memory. Certain memory types are required or desirable for certain operations. For example, memory reads with side effects or memory mapped I/O operations must be performed on memory of an uncacheable type (UC or UC—in the table above); in another instance, write-combining (WC) memory is often used for the implementation of video frame buffers for efficiency reasons. Further details of memory types in IA-32 may be found in the documentation. Other processor architectures may have physical memory respectively, and thus determine the memory types of those locations in physical memory.

A process to determine the memory type of a specific access based on the values of one or more of the above register fields and table entries is specified in the IA-32 documentation. IA-32 *Intel Architecture Software Developer's Manual*, Vol. 3: *System Programming Guide*, Ch. 10.

In general, it should be appreciated that the above description of memory typing is only an example of one embodiment. Many other embodiments of memory typing exist and are implemented and others may readily be visualized and designed by one in the art. For instance, a particular architecture may support more or fewer than the six memory types defined in Table 1. Other architectures may support more memory types including specific types based, for example, on level of caching, that are not supported in IA-32. Furthermore, the artisan may readily discern that a plethora of schemes for the specification of memory type by a processor for a memory location may be designed and implemented. Such schemes may or may not use a multiplicity of registers and register fields as are used in IA-32. In some instances fewer, or no, control registers may be used. In others memory type may be determined entirely from table-like structures maintained in the processor, or in memory, akin to the PAT or the MTRRs or both. Many other mechanisms for specifying and determining memory type are possible.

In a virtualized system, a virtual machine executing on a host implemented with an IA-32 architecture may itself provide an IA-32 virtual machine interface to guest software. Thus, the entire scheme of memory typing described above may be used by a guest process to specify a memory type for a guest-physical memory access by the virtual processor of a virtual machine implemented on a host. The virtual processor would in such a scenario have a virtual set of control registers, virtual MTRRs and PAT, and other fields and registers to specify caching behavior of the virtual processor's accesses to guest memory.

In such a circumstance, it may be important to reconcile the memory typing requirement of a memory access to guest-physical memory by a guest with the actual memory type of the memory location accessed by the host in fulfilling the requirements of the virtual machine making the access to guest-physical memory. Thus the underlying host must ensure correct behavior for guest memory accesses with respect to guest specified memory types.

If the virtual machine's memory typing scheme is implemented entirely by a VMM, this may cause a virtual machine exit event for all accesses by the guest to memory of certain types to ensure correctness of the access, which may in turn impose substantial performance penalties. For example, a guest access to guest-physical memory that is specified as uncacheable by the guest software generally must be mapped to a host-physical memory location that is also specified as uncacheable by the VMM. A VMM would then have to remap every uncacheable memory access request to an uncacheable memory access in the host.

In one embodiment such VMM monitoring may be avoided by incorporating support for memory typing of guest-physical memory by adding additional memory typing information to the EPT of the virtualization subsystem of the host processor and a set of fields to the VMCS.

Figure 6:
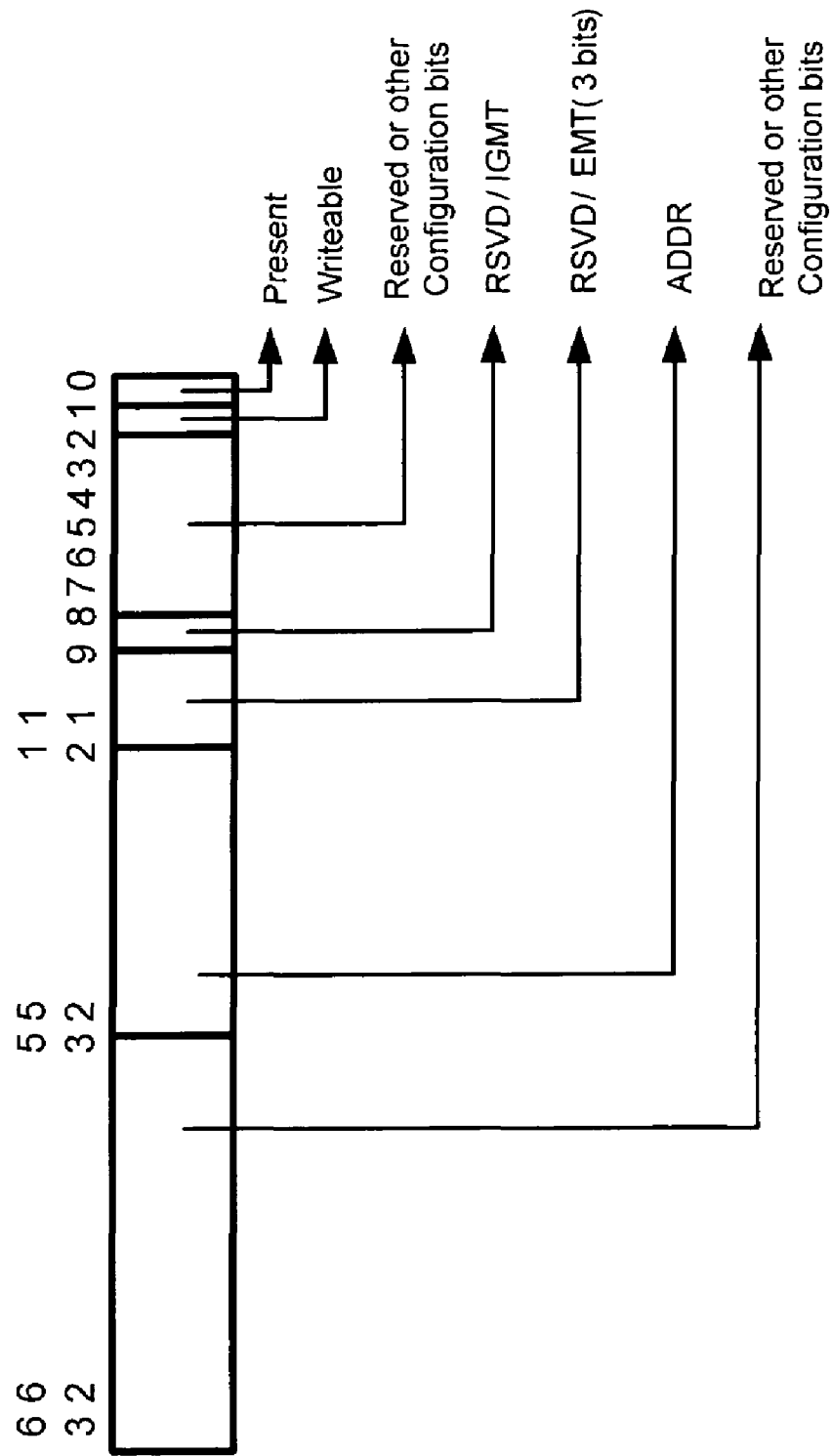
FIG. 6 depicts an extended paging table entry in one embodiment.

FIG. 6: This figure depicts an exemplary embodiment of the format of a leaf-node entry in an EPT table that supports virtualized memory typing. The general format of the entry is similar to that previously described in the EPT Patent Application. As therein described, each entry in an EPT table is 8 bytes in size, and contains a base host-physical address of a page in memory (ADDR) at bits 52:12 and permission and other configuration information. These include the present and writeable bits 0 and 1, and the reserved field at 63:53. This embodiment differs from the embodiments described in the EPT Patent Application in that bits 11:9 are now used to specify an Extended Memory Type (EMT) field and bit 8 is used to specify the Ignore Guest Memory Type (IGMT) flag, or IGMT. The remainder, bits 7:2 are reserved or used for other configuration or control information.

As before, the widths of the various bit fields may vary in other embodiments, for example the ADDR width may change depending on the number of address bits in a particular architecture or implementation. Furthermore, as discussed with reference to the EPT generally in the EPT Patent Application, EPT tables may be in a variety of different formats. For example, they may be implemented as simple, hierarchical tables. Alternatively, they may be single-level page tables or they may be hashed tables in some form. It will be obvious to one skilled in the art that a myriad of possible configurations are possible in other embodiments. Other variations are possible as discussed in the EPT Patent Application. Furthermore, the support for memory type information within the EPT tables is itself subject to myriad possible implementations. The width of the bit field used for memory type and its location within the EPT entry may vary. In a hierarchical table, a memory type may be specified for a number of leaf nodes by setting a field value in an interior node of the EPT table. More than one of these approaches may be combined as would be appreciated by one in the art.

Additionally, fields may be added to the VMCS to support EPT memory typing. In one embodiment, two fields are provided in the VMCS to support EPT memory typing. These fields are termed GUEST_PAT and HOST_PAT. A VMM utilizing EPT memory typing can use these fields to automatically change PAT values on transitions to and from a guest. In other embodiments, different support for translation of PAT values or other similar processor registers from the guest may be envisioned by one in the art.

Figure 7:
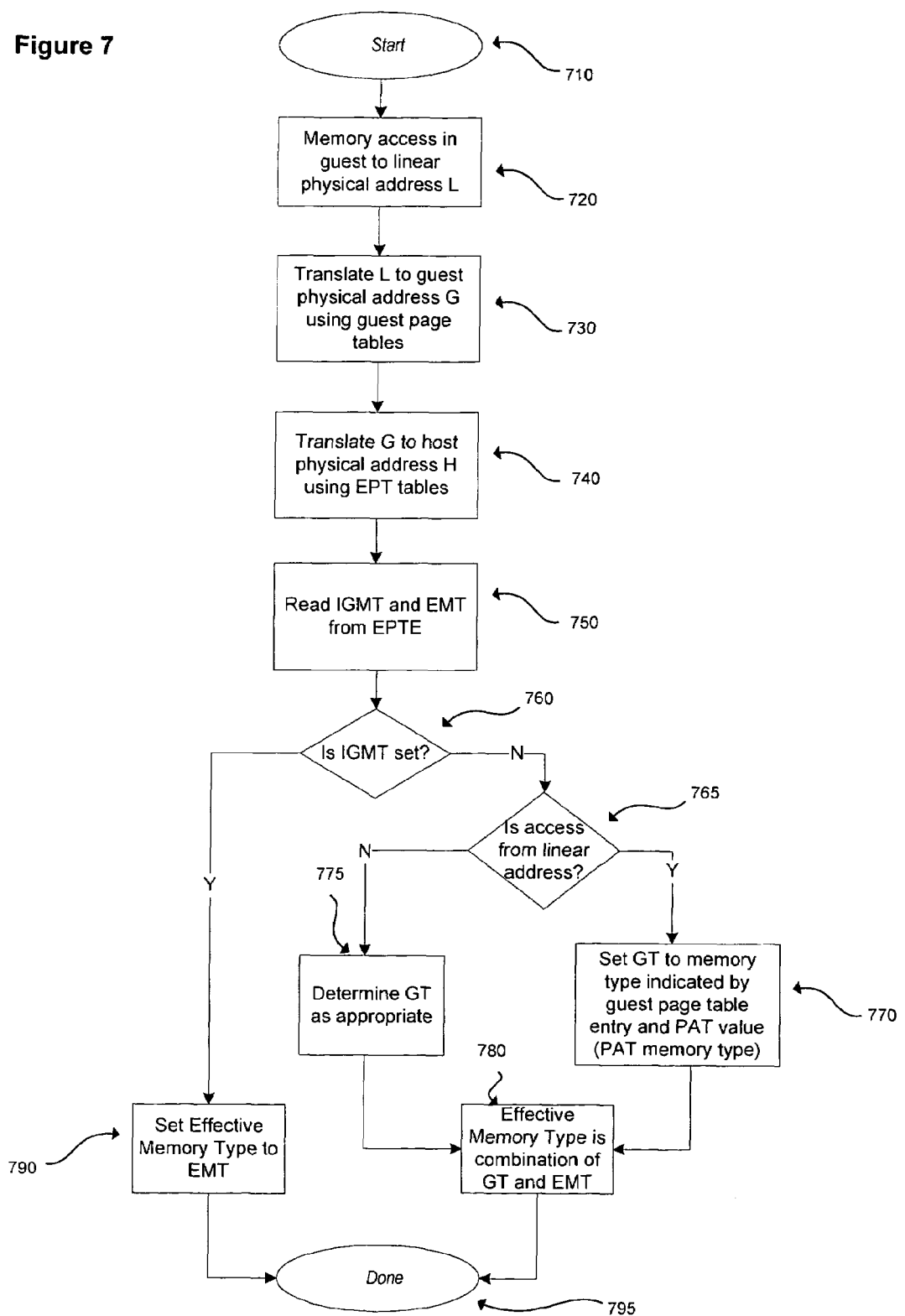
FIG. 7 depicts processing to determine effective memory type in one embodiment

FIG. 7 In FIG. 7, the process of determining effective memory type based on a guest memory type as specified by the extended memory type, or EMT field of the referencing EPT entry and the PAT values in the VMCS in one embodiment is shown starting at 710. After a guest access to guest linear memory location L at 720, the virtual processor in the guest using its internal memory management structures, such as the virtual machine's page table and virtual control registers, translates this access to guest-physical memory location G, 730. The memory mapping functionality of the EPT is then used to obtain the corresponding host-physical address H, 740. The host processor then reads the ignore-guest memory type flag, or IGMT, and the EMT entry from the EPT leaf entry for location G, 750.

If IGMT is set, 760 the EMT value specifies the memory type for the host memory access. In this case, the memory type specified by the guest software (e.g., as specified in the virtual control registers, MSRs, page-table, etc.) is not used.

If IGMT is clear, 760 and the guest-physical reference is generated as a translation of a guest-linear address, 765, the guest memory type is determined with reference to the PAT value chosen by bits in the guest paging entry (PDE or PTE) and the guest's value of the PAT MSR, 770.

If IGMT is clear, 760 and the guest-physical reference is not generated as a translation of a guest-linear address (i.e., the memory access is to a guest paging structure or other structure that is accessed using physical address only), 765, the guest memory type is determined by Table 10-6 in volume 3 of the IA-32 documentation, where the PCD and PWT come from either the guest value of CR3 or from a guest paging entry (whichever references the entry being accessed) and the "MTRR" value is the type indicated in EMT, 770.

In one embodiment, the final effective memory type is determined 780 using the guest memory type (GT) and EMT. In one embodiment, these values are combined in accordance with the process defined for the IA-32 architecture with the "MTRR" value using the type indicated in EMT. In other embodiments, other mechanisms to combine GT and EMT are possible.

Although the examples provided may describe providing support for memory typing in physical memory virtualization in a virtual machine system in the context of execution units and logic circuits, other embodiments can be accomplished at least in part by way of software. Some embodiments may be provided as a software program product or software which may include a machine or machine-readable medium having stored thereon instructions which when accessed by the machine perform a process of the embodiment. In other embodiments, processes might be performed by specific hardware components that contain hardwired logic for performing the processes, or by any combination of programmed components and custom hardware components.

In the preceding description, for purposes of explanation, numerous specific details are set forth in order to provide a thorough understanding of the described embodiments, however, one skilled in the art will appreciate that many other embodiments may be practiced without these specific details.

Some portions of the detailed description above is presented in terms of algorithms and symbolic representations of operations on data bits within a processor-based system. These algorithmic descriptions and representations are the means used by those skilled in the art to most effectively convey the substance of their work to others in the art. The operations are those requiring physical manipulations of physical quantities. These quantities may take the form of electrical, magnetic, optical or other physical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the description, terms such as "executing" or "processing" or "computing" or "calculating" or "determining" or the like, may refer to the action and processes of a processor-based system, or similar electronic computing device, that manipulates and transforms data represented as physical quantities within the processor-based system's storage into other data similarly represented or other such information storage, transmission or display devices.

In the description of the embodiments, reference may be made to accompanying drawings. In the drawings, like numerals describe substantially similar components throughout the several views. Other embodiments may be utilized and structural, logical, and electrical changes may be made. Moreover, it is to be understood that the various embodiments, although different, are not necessarily mutually exclusive. For example, a particular feature, structure, or characteristic described in one embodiment may be included within other embodiments.

Further, a design of an embodiment that is implemented in a processor may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) that constitute or represent an embodiment.

Embodiments may be provided as a program product that may include a machine-readable medium having stored thereon data which when accessed by a machine may cause the machine to perform a process according to the claimed subject matter. The machine-readable medium may include, but is not limited to, floppy diskettes, optical disks, DVD-ROM disks, DVD-RAM disks, DVD–RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media/machine-readable medium suitable for storing electronic instructions. Moreover, embodiments may also be downloaded as a program product, wherein the program may be transferred from a remote data source to a requesting device by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the claimed subject matter. It will be apparent to those skilled in the art that many further modifications and adaptations can be made. The particular embodiments are not provided to limit the claimed subject matter but to illustrate it. The scope of the claimed subject matter is not to be determined by the specific examples provided above but only by the claims below.

What is claimed is:

1. A processor, capable of operation in a host machine, comprising:
   memory management logic to support a plurality of memory types for a physical memory access by the processor; and
   virtualization support logic
   to determine a host memory type for a reference to a memory location by a guest in a virtual machine executable on the processor based at least in part on a memory type field stored in an entry of an extended paging table of a virtualization support system of the host machine (extended memory type field);
   to determine a guest memory type for the reference to the memory location; and
   to determine an effective memory type based at least in part on the guest memory type if a flag stored in the entry of the extended paging table of the virtualization support system has a first flag value, and otherwise, to determine the effective memory type independent of the guest memory type if the flag has a second flag value distinct from the first value.

2. The processor of claim 1 wherein the virtualization support logic is further to map the reference to the memory location by the guest in the virtual machine executable on the processor to a reference to host-physical memory of the host machine based at least in part on the extended paging table.

3. The processor of claim 1 wherein the guest memory type is specified at least in part by a memory type specification field of a virtual processor of the virtual machine.

4. The processor of claim 3 wherein the memory type specification field of the virtual processor is one or more bits of at least one of
a memory type range register of the virtual processor;
a field in a page attribute table of the virtual processor, and
a field in a control register of the virtual processor.

5. The processor of claim 1 further to execute a virtual machine monitor to store at least one of a memory type value in the memory type field in the extended memory type field (extended memory type) and a flag value in the flag in the entry of the extended paging table.

6. The processor of claim 5 further to determine the effective memory type depending at least in part on the extended memory type.

7. The processor of claim 1 wherein each of the guest memory type and the effective memory type, respectively, further comprises at least one of
a definition of a snooping behavior of the processor when performing a memory access;
a definition of a caching behavior of the processor when performing a memory access; and
a definition of a memory ordering behavior of the processor when performing a memory access.

8. The processor of claim 5 wherein the extended memory type field comprises a field of a leaf-node extended paging table entry.

9. The processor of claim 5 wherein the virtualization support system further comprises a field for storing a value of a page attribute table of a host component of the virtual machine monitor and a field for storing a value of a page attribute table of the virtual machine.

10. The processor of claim 1 wherein the effective memory type, the host memory type and the guest memory type each comprises at least one of the following: uncacheable, write combining, write through, write back, write protect, snooped, unsnooped, self-snooped, strongly ordered, weakly ordered, and processor ordered.

11. The processor of claim 5 wherein determining the effective memory type based on at least one of the host memory type and the guest memory type further comprises determining the effective memory type based at least in part on a mapping from each pair of possible values of extended memory type and guest memory type to an effective memory type.

12. A system comprising a host machine including a processor, the processor further comprising:
memory management logic to support a plurality of memory types for a physical memory access by the processor; and
virtualization support logic
to determine a host memory type for a reference to a memory location by a guest in a virtual machine executable on the processor based at least in part on a memory type field stored in an entry of an extended paging table of a virtualization support system of the host machine (extended memory type field);
to determine a guest memory type for the reference to the memory location; and
to determine an effective memory type based at least at least in part on the guest memory type if a flag stored in the entry of the extended paging table of the virtualization support system has a first flag value, and otherwise, to determine the effective memory type independent of the guest memory type if the flag has a second flag value distinct from the first value.

13. The system of claim 12 wherein the virtualization support logic is further to map the reference to the memory location by the guest in the virtual machine executable on the processor to a reference to host-physical memory of the host machine based at least in part on the extended paging table.

14. The system of claim 12 wherein the guest memory type is specified at least in part by a memory type specification field of a virtual processor of the virtual machine.

15. The system of claim 12 further to execute a virtual machine monitor to store at least one of a memory type value in the memory type field in the extended memory type field (extended memory type) and a flag value in the flag in the entry of the extended paging table.

16. The system of claim 15 further to determine the effective memory type depending at least in part on the extended memory type.

17. The system of claim 15 wherein the extended memory type field comprises a field of a leaf-node extended paging table entry.

18. The system of claim 15 wherein the virtualization support system further comprises a field for storing a value of a page attribute table of a host component of the virtual machine monitor and a field for storing a value oft page attribute table of the virtual machine.

19. The system of claim 15 wherein determining the effective memory type based on at least one of the host memory type and the guest memory type further comprises determining the effective memory type based at least in part on a mapping from each pair of possible values of extended memory type and guest memory type to an effective memory type.

20. The system of claim 12 wherein each of the guest memory type and the effective memory type, respectively, further comprises at least one of
a definition of a snooping behavior of the processor when performing a memory access;
a definition of a caching behavior of the processor when performing a memory access; and
a definition of a memory ordering behavior of the processor when performing a memory access.

21. The system of claim 12 wherein the effective memory type, the host memory type and the guest memory type each comprises at least one of the following: uncacheable, write combining, write through, write back, write protect, snooped, unsnooped, self-snooped, strongly ordered, weakly ordered, and processor ordered.

22. The system of claim 14 wherein the memory type specification field of the virtual processor is one or more bits of at least one of
a memory type range register of the virtual processor;
a field in a page attribute table of the virtual processor, and
a field in a control register of the virtual processor.

23. The system of claim 12 further comprising dynamic random access memory (DRAM).

24. A method comprising:
determining a host memory type for a reference to a memory location by a guest in a virtual machine executable on a processor based at least in part on a memory type field stored in an entry of an extended paging table of a virtualization support system of a host machine of the processor (extended memory type field);

determining a guest memory type for the reference to the memory location; and determining an effective memory type based at least in part on the guest memory type if a flag stored in the entry of the extended paging table of the virtualization support system has a first flag value, and otherwise, determining the effective memory type independent of the guest memory type if the flag has a second flag value distinct from the first value.

25. The method of claim 24 further comprising:

mapping the reference to the memory location by the guest in the virtual machine executable on the processor to a reference to host-physical memory of the host machine based at least in part on the extended paging table.

26. The method of claim 24 wherein the guest memory type is specified at least in part by a memory type specification field of a virtual processor of the virtual machine.

27. The method of claim 26 wherein the memory type specification field of the virtual processor is one or more bits of at least one of a memory type range register of the virtual processor;
a field in a page attribute table of the virtual processor, and
a field in a control register of the virtual processor.

28. The method of claim 24 further comprising executing a virtual machine monitor to store at least one of a memory type value in the memory type field in the extended memory type field (extended memory type) and a flag value in the flag in the entry of the extended paging table.

29. The method of claim 28 further comprising determining the effective memory type depending at least in part on the extended memory type.

30. The method of claim 28 wherein the extended memory type field comprises a field of a leaf-node extended paging table entry.

31. The method of claim 28 wherein determining the effective memory type based on at least one of the host memory type and the guest memory type further comprises determining the effective memory type based at least in part on a mapping from each pair of possible values of extended memory type and guest memory type to an effective memory type.

32. The method of claim 28 wherein the virtualization support system further comprises a field for storing a value of a page attribute table of a host component of the virtual machine monitor and a field for storing a value of a page attribute table of the virtual machine.

33. The method of claim 24 wherein each of the guest memory type and the effective memory type, respectively, further comprises at least one of a definition of a snooping behavior of the processor when performing a memory access;
a definition of a caching behavior of the processor when performing a memory access; and
a definition of a memory ordering behavior of the processor when performing a memory access.

34. The method of claim 27 wherein the effective memory type, the host memory type and the guest memory type each comprises at least one of the following: uncacheable, write combining, write through, write back, write protect, snooped, unsnooped, self-snooped, strongly ordered, weakly ordered, and processor ordered.

* * * * *